United States Patent [19]

Zepeda

[11] 4,174,003
[45] Nov. 13, 1979

[54] RAKE ATTACHMENT KIT

[76] Inventor: Lamberto C. Zepeda, 492 Santa Rita, Superior, Ariz. 85723

[21] Appl. No.: 894,340

[22] Filed: Apr. 7, 1978

[51] Int. Cl.² .............................................. A01B 1/20
[52] U.S. Cl. ................................ 172/375; 56/400.06; 172/378
[58] Field of Search .............................. 172/375, 378; 56/400.04, 400.05, 400.06, 400.08, 400.16; 294/51, 52

[56] References Cited
U.S. PATENT DOCUMENTS

| | | | |
|---|---|---|---|
| 838,100 | 12/1906 | Gilbert | 56/400.06 |
| 938,001 | 10/1909 | Kropp | 56/400.06 X |
| 1,800,103 | 4/1931 | Pihl | 56/400.06 |

FOREIGN PATENT DOCUMENTS 252671   10/1948   Switzerland ......................... 56/400.04

*Primary Examiner*—Richard T. Stouffer
*Attorney, Agent, or Firm*—Don J. Flickinger

[57] ABSTRACT

A kit for converting a conventional rake having one row of tines to one having two rows of tines in back-to-back relation. The kit comprises a straight attachment bar having sawteeth on one edge and three clamping plate assemblies, each of which consists of a pair of complemental plates shaped to have the back bar of a conventional rake snugly received therebetween, and a pair of bolts and nuts which clamp the plates toward each other. A shim is also provided for each plate assembly which adapts the latter to a conventional rake having a particular curvature in its back bar and tines.

2 Claims, 7 Drawing Figures

RAKE ATTACHMENT KIT

The present invention relates to rakes and is concerned primarily with a kit which includes a toothed bar that is attached to convert a conventional rake having a single row of tines to one having rows of teeth and tines in back-to-back relation.

BACKGROUND OF THE INVENTION

So-called conventional rakes have a single row of tines integral with and extending from a back bar, and it may be stated that as a general rule the tines of such a conventional rake are curved, relatively thin or narrow, are widely spaced apart and are long. These known rakes have proven to be satisfactory in doing the job ordinarily expected of a conventional rake. However, there are many kinds of work that are better carried out with more efficiency if the use of the long, thin tines is avoided and relatively wider and more closely spaced teeth are used.

Because of this condition rakes have been provided which present two rows of teeth in back-to-back relation. However, in the known rakes of this character, the two rows of teeth are integrally joined usually by being extended from a common back bar. Such rakes have met with little or no public acceptance because the user must always manipulate both rows of tines and the weight of the unused row amounts to nothing more than an impediment to the conventional raking operation.

Because of the foregoing unsatisfactory condition, it has been proposed to provide an attachment that is applied to a rake to convert it to one having two rows of tines or teeth. Such devices have also met with little public approval due mainly to the fact that the basic rake, if it can be said to be curved, is of special construction and it is not practical to provide a conversion kit for only such specially constructed rakes.

Before this application was filed in the Patent and Trademark Office, a patentability search was conducted which brings to light the following patents as those found which are believed to come closest to the subject conversion kit attachment:

Gilbert; U.S. Pat. No. 838,100
Pihl; U.S. Pat. No. 1,800,103
Sawyer; U.S. Pat. No. 2,010,325
Loree; U.S. Pat. No. 607,383
Kropp; U.S. Pat. No. 938,001
Rundberg; U.S. Pat. No. 1,352,386
Ritchie; U.S. Pat. No. 1,191,911
Carkey; U.S. Pat. No. 1,632,883.

A brief comment is made on the more pertinent of these patents as follows:

Ritchie and Carkey

In these patents, the two rows of teeth and tines are integrally joined and are not removably connected.

Rundberg

Here the two rows of teeth are not only integrally joined, but are arranged at an angle relative to each other and which angle is not a straight angle.

Kropp

This patent is believed to be the reference closest to the present subject. It discloses the long, curved, thin tines 5 integral with and extending from arm 3. It also shows sawteeth 10 integral with and extending from bar 7. The rake without bar 7 and tines 10 and 20 is not a conventional rake and the attachment means is complex.

Sawyer

Here a base plate 30 is attached to the rake rather than a second row of teeth or tines.

No comment is made on the remaining patents other than to note that they are believed to complete the picture of the relevant prior art.

OBJECTS OF THE INVENTION

With the foregoing conditions in mind, the present invention has in view the following objectives:

1. To provide a kit for converting a conventional rake including a back bar and a row of spaced tines integral therewith and extending therefrom to a rake having a second row of teeth or tines in back-to-back relation by securing a removable attachment to a conventional rake;

2. To provide, in a kit of the type noted, a removable attachment including a row of sawteeth;

3. To provide, in a kit of the character aforesaid, new and improved means for removably securing an attachment to a conventional rake;

4. To provide, in a kit of the kind described, a plurality of clamping plate assemblies removably mounting the attachment on the conventional rake;

5. To provide, in a kit of the type noted, a plurality of clamping plate assemblies each of which comprises a pair of complemental plates shaped to conform to the contour of the back bar of the rake and the attachment bar, whereby said bars are snugly nested within and between said plates and a pair of bolts and nuts for each of said assemblies, one of said bolts passing beneath said rake bar and between the rows of tines or orifices therein while the other bolt passes between the teeth of the attachment or an aperture therein; and 6. To provide, in a kit of the character aforesaid, a shim for each plate assembly which is interposed between the back bar of the rake and the bar of the attachment when the curvature of the back bar requires such a shim to achieve the desired relation with the bars.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are achieved by providing a kit including an attachment and a plurality of plate assemblies removably securing the attachment to the back bar of a conventional rake. In some instances, the back bars are flat or straight, while in other cases they are curved transversely; that is, from a bottom edge to a top edge. A plurality of long and widely spaced tines are integral with and extend from the back bar.

The attachment takes the form of a long straight bar which partially overlaps the rake bar and has one edge formed with short, broad and widely spaced teeth that are generally known as sawteeth.

A plurality of plate assemblies removably secure the attachment to the rake bar. Each plate assembly comprises a back plate and a front plate. The back plate engages the back surface of the attachment bar and the upper portion of the back surface of the rake bar. It is shaped to conform to the contour of these bar surfaces with a fairly high degree of accuracy. Likewise, the front bar engages the front face of the attachment bar and a portion of the front face of the rake bar with a high degree of accuracy. Each of these plates is formed with an orifice in its upper region and an aperture in the lower area. The surfaces of the two plates align and a bolt passes through the aligned orifices and assumes a position over the rake bar and between a pair of adjacent teeth of the attachment. Another bolt passes through the aligned apertures in a position below the bar of the attachment and surface respectively.

In a modification in which there is a pronounced curvature in the rake bar, a shim is inserted between the rake bar and the attachment bar of each plate assembly to assure a tightly fitted connection and elimination of looseness between the assembled elements.

For a full and more complete understanding of the invention, reference may be had to the following description and accompanying drawings, in which.

DESCRIPTION OF A PREFERRED EMBODIMENT

Figure 1:
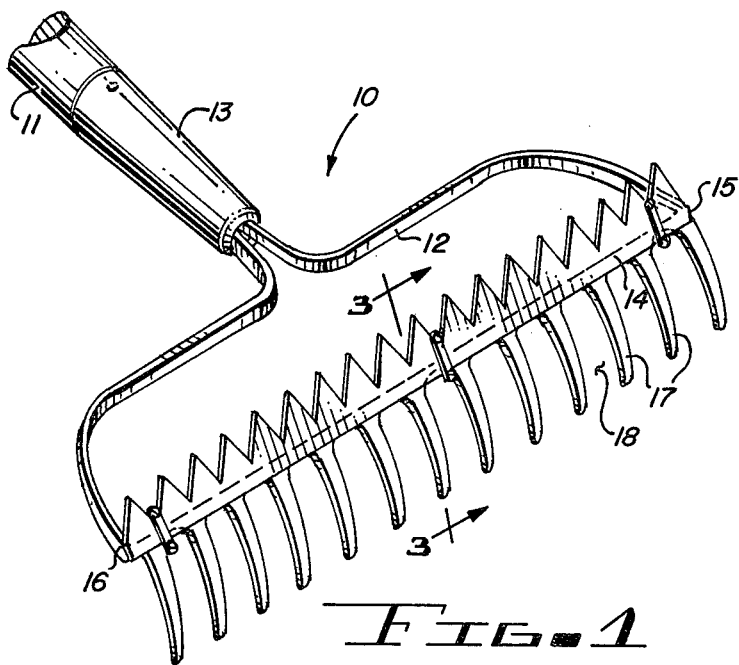
FIG. 1 is a perspective illustrating the lower end of a conventional rake with an attachment applied thereto by the kit which is the subject of this invention.

Referring now to the drawing, wherein like reference characters denote corresponding parts, the lower end of a conventional rake is identified in its entirety by the reference character 10. It comprises a handle 11 to which a pair of complemental support arms 12 are secured by a ferrule 13. A rake or back bar 14 has one end attached to an end of one arm 12 as indicated at 15 and its other end attached to the end of the other arm 12 as indicated at 16. These connections at 15 and 16 may be integral, in which the back bar 14 is integrally joined to arms 12. A plurality of tines 17 depend from back bar 14 in comparatively widely spaced relation as determined by spaces 18. Each tine 17 is curved as indicated more clearly in FIG. 3 and is relatively long and thin. The upper end of each tine 17 is integrally connected to back bar 14.

The conversion kit is identified generally at 19 and comprises an attachment bar 20 having sawteeth 21 integral therewith and extending upwardly therefrom. Also included as a part of the attachment 19 are a plurality of plate assemblies each of which is designated generally 22. While the number of plate assemblies employed to removably secure attachment bar 20 to back bar 14 of rake 10 may vary, three such assemblies are illustrated in FIG. 1. It is believed to be possible that two such plate assemblies may be sufficient to achieve and maintain the desired assembled relation and more than three may be employed; however, three such assemblies may be considered as the preferred embodiment. Each plate assembly 22 comprises a so-called back plate 23, a front plate 24, a pair of bolts 25 and a nut 26 for each bolt 25.

Figure 3:
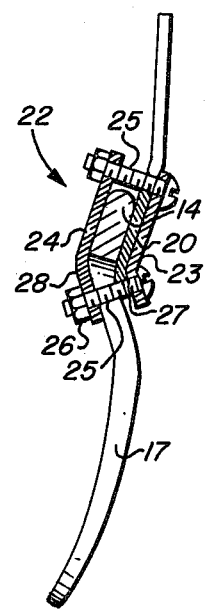
FIG. 3 is another view taken on an enlarged scale and about on the plane represented by the line 3—3 of FIG. 1.
Figure 2:
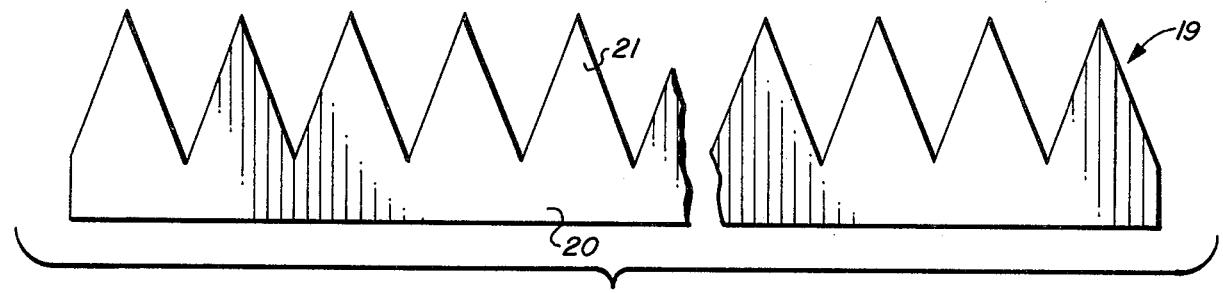
FIG. 2 is an elevation taken on an enlarged scale of an attachment bar with parts broken away and depicted in exploded relation.

As illustrated in FIG. 3, back plate 23 has a substantially flat portion which engages the rear face of back bar 14 and a lower extension 27 that in itself is substantially flat but which is integrally joined to the main portion of back plate 23 by a bend. Likewise, front plate 24 has a substantially flat portion in engagement with the front face of back bar 14 and a lower flange 28 which engages a front face of bar 14, being integrally connected to the main portion of front plate 24 by a bend.

Three arrangements for utilizing the bolts 25 to secure each plate assembly 22 to a back bar 14 will now be described. Thus, in FIG. 4 one bolt 25 passes through the apex where a pair of adjacent sawteeth meet and the other bolt 25 passes between a pair of adjacent tines 17, in which case the back bar 14 is formed with an arcuate recess 29 to accommodate the bolt.

Figure 5:
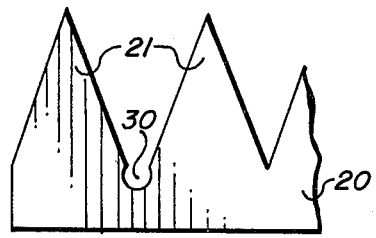
FIG. 5 is a detail similar to FIG. 4 of a modification for receiving the bolts of the plate assemblies.

In FIG. 5, attachment bar 20 is formed with a recess 30 which has an arcuate extent of slightly less than 360° between adjacent teeth 21. In this arrangement, the upper bolt 25 passes through this recess 30.

Figure 6:
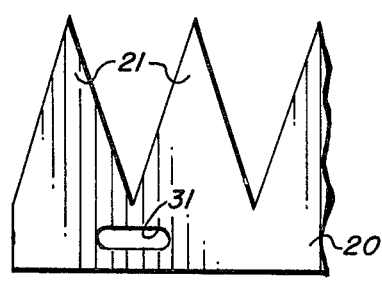
FIG. 6 is still another view similar to FIGS. 4 and 5 depicting a further modification of the arrangement for securing the bolts to the attachment bar.

In FIG. 6, attachment bar 20 is formed with an elongate slot 31 beneath the apex of a pair of adjacent teeth 21. In this embodiment, the upper of the bolts 25 passes through this slot 31 which allows for a certain amount of lateral adjustment in assemblying the attachment 19 on rake 10.

Figure 7:
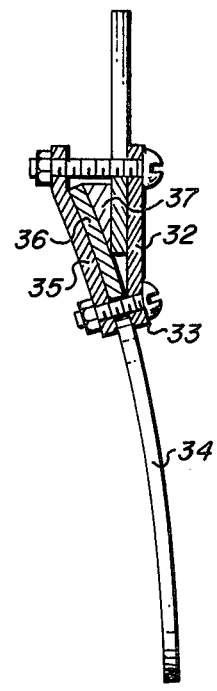
FIG. 7 is a view similar to FIG. 3 of a modification illustrating one of the shims.

As shown in FIG. 7, back plate 23 of FIG. 3 is replaced by back plate 32 which is flat throughout most of its extent and has a flange 33 at its lower end which is joined thereto by a bend which is very slight. In this form, tines 34 do not have a curvature which is as pronounced as is the curvature of the tines 17. Front plate 24 is also replaced by a front plate 35 which is substantially flat throughout its entire extent and has a slight curvature adjacent to its lower end. With the plates 32 and 35 and tines 34 having the formations illustrated and described above, there would ordinarily be a large space between the rear face of back bar 36 of the rake and back plate 32. Such spacing would generate an undesirable degree of looseness in this area. To eliminate such looseness, a shim 37 is interposed between the front face of attachment bar 20 and the rear face of rake bar 36.

Figure 4:
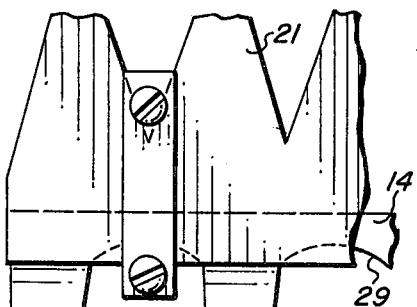
FIG. 4 is another detail on an enlarged scale showing one arrangement for securing the clamping plates to the attachment and rake bars by the bolts and nuts.

In the embodiment of FIG. 7, the plate assemblies and bolts may assume any of the positions illustrated in FIGS. 4, 5 and 6.

While preferred specific embodiments of the invention are hereinbefore illustrated, it is to be clearly understood that the invention is not to be limited to the exact constructions, mechanisms and designs illustrated and described because various modifications of these details may be provided in putting the invention into practice.

What is claimed is:

1. A kit for converting a conventional rake including a back bar having a plurality of curved, long, thin, widely spaced tines depending therefrom to a rake including an attachment bar having a plurality of sawteeth substantially opposite to said tines and arranged in general back-to-back relation with respect thereto, said kit comprising:

(a) an attachment comprising a bar adapted to be arranged in substantially back-to-back relation with respect to the rake bar and having a plurality of sawteeth extending upwardly therefrom, said sawteeth adapted to be shorter, more closely spaced and wider than said tines; and
(b) means for removably securing said attachment bar to said rake bar, including,
  (i) a plurality of plate assemblies each of which comprises a pair of complemental plates which are curved so as to be adapted to conform to the contour of said rake and attachment bars which are positioned therebetween, and
  (ii) a pair of bolts and nuts for each plate assembly with one nut passing through the apices of adjacent sawteeth of the attachment bar and the other bolt adapted to pass between adjacent tines and below said rake bar, for clamping said plates towards each other.

2. The kit of claim 1 in which each pair of sawteeth which accommodates one of said bolts is formed at the apex at which said teeth meet with an arcuate recess of an extent slightly less than 360°.

* * * * *